United States Patent
Gu et al.

(10) Patent No.: US 9,900,132 B2
(45) Date of Patent: Feb. 20, 2018

(54) PILOT SIGNAL TRANSMISSION METHOD, ASSOCIATED TRANSMIT-RECEIVE POINT, PILOT SIGNAL RECEPTION METHOD AND ASSOCIATED USER EQUIPMENT

(71) Applicant: Telefonaktiebolaget L M Ericsson (publ), Stockholm (SE)

(72) Inventors: Xinyu Gu, Beijing (CN); Qingyu Miao, Beijing (CN); Zhang Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 103 days.

(21) Appl. No.: 14/442,288

(22) PCT Filed: Oct. 18, 2013

(86) PCT No.: PCT/CN2013/085442
§ 371 (c)(1),
(2) Date: May 12, 2015

(87) PCT Pub. No.: WO2014/075532
PCT Pub. Date: May 22, 2014

(65) Prior Publication Data
US 2016/0285603 A1 Sep. 29, 2016

Related U.S. Application Data

(63) Continuation of application No. PCT/CN2012/084582, filed on Nov. 14, 2012.

(51) Int. Cl.
*H04L 5/00* (2006.01)
*H04L 25/02* (2006.01)
*H04W 52/32* (2009.01)

(52) U.S. Cl.
CPC ............ *H04L 5/0048* (2013.01); *H04L 5/005* (2013.01); *H04L 5/0051* (2013.01);
(Continued)

(58) Field of Classification Search
CPC ..... H04L 5/0048; H04L 5/005; H04L 5/0051; H04L 5/0035; H04L 5/0053;
(Continued)

(56) References Cited

U.S. PATENT DOCUMENTS 7,433,339 B2 * 10/2008 Kaipainen ............ H04B 7/0619
370/334
8,717,994 B2 * 5/2014 Ko ........................ H04B 7/0413
370/329

(Continued)

FOREIGN PATENT DOCUMENTS

| CN | 1642052 | 7/2005 |
|---|---|---|
| CN | 102655486 | 9/2012 |

OTHER PUBLICATIONS

PCT Notification of the International Search Report and the Written Opinion of the International Searching Authority, or the Declaration for International application No. PCT/CN2013/085442, dated Jan. 23, 2014.

*Primary Examiner* — Wutchung Chu
(74) *Attorney, Agent, or Firm* — Patent Portfolio Builders, PLLC (57) ABSTRACT

The present disclosure discloses a pilot signal transmission method in a wireless communication system and an associated Transmit-Receive Point (TRP). The method comprises transmitting a periodic pilot signal for channel estimation from at least one TRP in the proximity of a User Equipment (UE) within a combined cell, when the UE is not scheduled for data transmission. The method further comprises transmitting a pilot signal for demodulation from the same TRP, when the UE is scheduled for data transmission. The trans- (Continued)

mission power of the periodic pilot signal for channel estimation is lower than that of the pilot signal for signal for channel demodulation. The present disclosure further provides a pilot signal reception method in a wireless communication network and an associated UE.

14 Claims, 6 Drawing Sheets

(52) U.S. Cl.
CPC ...... *H04L 25/0224* (2013.01); *H04L 25/0228* (2013.01); *H04W 52/325* (2013.01)

(58) Field of Classification Search
CPC ... H04L 5/0094; H04L 1/0026; H04L 5/0073; H04W 72/042; H04W 72/082; H04W 48/16; H04W 24/10; H04W 72/0406; H04W 72/0446
See application file for complete search history.

(56) References Cited

U.S. PATENT DOCUMENTS

| | | | |
|---|---|---|---|
| 9,385,904 B2* | 7/2016 | Goransson | H04W 52/325 |
| 2005/0047488 A1 | 3/2005 | Sugahara | |
| 2005/0135324 A1* | 6/2005 | Kim | H04L 1/005 370/343 |
| 2008/0232504 A1* | 9/2008 | Ma | H04L 5/0023 375/267 |
| 2009/0286497 A1 | 11/2009 | Akkarakaran et al. | |
| 2010/0020771 A1* | 1/2010 | Ji | H04L 1/0004 370/336 |
| 2010/0118989 A1* | 5/2010 | Sayana | H04L 5/0035 375/260 |
| 2011/0228735 A1* | 9/2011 | Lee | H04L 5/0051 370/329 |
| 2012/0003981 A1* | 1/2012 | Krishnamurthy | H04W 24/10 455/450 |
| 2012/0281554 A1* | 11/2012 | Gao | H04W 48/12 370/252 |
| 2012/0281555 A1* | 11/2012 | Gao | H04L 1/0031 370/252 |
| 2012/0281567 A1* | 11/2012 | Gao | H04B 7/0626 370/252 |
| 2013/0034070 A1* | 2/2013 | Seo | H04B 7/155 370/329 |
| 2013/0121186 A1* | 5/2013 | Vajapeyam | H04W 72/085 370/252 |
| 2013/0121276 A1* | 5/2013 | Kim | H04W 72/0406 370/329 |
| 2013/0301562 A1* | 11/2013 | Liao | H04W 72/042 370/329 |
| 2014/0369287 A1* | 12/2014 | Kim | H04L 25/0202 370/329 |
| 2015/0085769 A1* | 3/2015 | Parkvall | H04W 24/02 370/329 |

* cited by examiner

PILOT SIGNAL TRANSMISSION METHOD, ASSOCIATED TRANSMIT-RECEIVE POINT, PILOT SIGNAL RECEPTION METHOD AND ASSOCIATED USER EQUIPMENT

PRIORITY

This nonprovisional application is a U.S. National Stage Filing under 35 U.S.C. § 371 of International Patent Application Serial No. PCT/CN2013/085442, filed Oct. 18, 2013, and entitled "Pilot Signal Transmission Method, Associated Transmit-Receive Point, Pilot Signal Reception Method and Associated User Equipment" which claims priority to International Patent Application Serial No. PCT/CN2012/084582 filed Nov. 14, 2012, both of which are hereby incorporated by reference in their entirety.

TECHNICAL FIELD

The present disclosure generally relates to configuration and use of pilot signal, and particularly, to a pilot signal transmission method, an associated Transmit-Receive Point (TRP), a pilot signal reception method, and an associated User Equipment (UE).

BACKGROUND

The number of smart phones, wireless-enabled tablets and laptop computers in the Universal Mobile Telecommunications System (UMTS) networks is growing rapidly. It is important for network operators to evolve their networks in terms of capacity and coverage so that positive user experience can be sustained.

Deployment of low-power nodes (LPNs) is seen as a powerful tool to achieve the goal. A network consisting of traditional macro NodeBs and LPNs is referred to as a heterogeneous network. Two use-cases for heterogeneous network deployment that may be envisioned are coverage holes and localized traffic hotspots. Deployment of LPNs as a complement to a macro network then aims at improving coverage and capacity, respectively.

In the heterogeneous network deployment, an LPN can either form a separate cell (such as, a pico cell or a micro cell) by itself or be one of the spatially separated TRPs in one logical cell. The former case is referred to as separated-cell scenario, while the latter case is referred to as combined-cell (or shared-cell) scenario.

As compared with the separated-cell scenario, signalling reception and interference handling for the combined-cell scenario are much easier. Moreover, for the combined-cell scenario, no handover is needed between the different TRPs in the same combined cell, ensuring a more smooth mobility procedure and easing the Radio Network Controller (RNC) load.

However, according to the prior-art transmission scheme for the combined-cell scenario, all TRPs within a combined-cell transmit the same physical channel. This adversely limits the system capacity of the combined cell.

At Technical Specification Group-Radio Access Network (TSG-RAN) meeting #56, a study item (SI) was initiated on Universal Mobile Telecommunications System (UMTS) Heterogeneous Networks for $3^{rd}$ Partnership Project (3GPP) Rel-12 [1]. There exist more opportunities for 3GPP Rel-12 to include value-added features to further improving the performance of Heterogeneous Networks.

SUMMARY

An object of the present embodiments is to facilitate simultaneous transmissions to more than one UEs from selected TRPs in the proximity of the UEs within the same combined cell by providing a novel pilot signal transmission method, an associated TRP, a pilot signal reception method and an associated UE.

A further object of the present embodiments is to achieve accurate channel estimation even prior to scheduled data transmission to the UE at the expense of relatively low power consumption.

To achieve the object, according to a first aspect of the embodiments, there is provided a pilot signal transmission method performed by a TRP in a wireless communication system. The TRP is in the proximity of a User Equipment (UE) within a combined cell. The method comprises transmitting a periodic pilot signal for channel estimation from the TRP, when the UE is not scheduled for data transmission. The method also comprises transmitting a pilot signal for demodulation from the same TRP, when the UE is scheduled for data transmission. A transmission power of the periodic pilot signal for channel estimation is lower than that of the pilot signal for demodulation.

According to a second aspect of the embodiments, there is provided a TRP. The TRP is in the proximity of a UE within a combined cell and comprises a first pilot signal transmission unit configured to transmit a periodic pilot signal for channel estimation from the TRP, when the UE is not scheduled for data transmission. The TRP also comprises a second pilot signal transmission unit configured to transmit a pilot signal for demodulation from the same TRP, when the UE is scheduled for data transmission. A transmission power of the periodic pilot signal for channel estimation is lower than that of the pilot signal for demodulation.

According to a third aspect of the embodiments, there is provided a pilot signal reception method performed by a UE in a wireless communication network. The method comprises receiving a periodic pilot signal for channel estimation from at least one TRP in the proximity of a UE within a combined cell, when the UE is not scheduled for data transmission. The method also comprises receiving a pilot signal for demodulation from the same TRP, when the UE is scheduled for data transmission. A transmission power of the periodic pilot signal for channel estimation is lower than that of the pilot signal for demodulation.

According to a fourth aspect of the embodiments, there is provided a UE. The UE comprises a first pilot signal receiving unit configured to receive a periodic pilot signal for channel estimation from at least one TRP in the proximity of the UE within a combined cell, when the UE is not scheduled for data transmission. The UE also comprises a second pilot signal receiving unit configured to receive a pilot signal for demodulation from the same TRP, when the UE is scheduled for data transmission. A a transmission power of the periodic pilot signal for channel estimation is lower than that of the pilot signal for demodulation.

According to a fifth aspect of the embodiments, there is provided a TRP. The TRP comprises a memory which has machine-readable program code stored therein and a processor which executes the stored program code to control the TRP to perform the method according to the first aspect of the embodiments.

According to a sixth aspect of the embodiments, there is provided a UE. The UE comprises a memory which has machine-readable program code stored therein and a processor which executes the stored program code to control the UE to perform the method according to the third aspect of the embodiments.

According to a seventh aspect of the embodiments, there is provided a computer readable medium storing therein a program for a TRP or a UE, the program causing the TRP or the UE to perform a method according to the first and third aspects of the embodiments.

As a pilot signal for demodulation is transmitted from one or more selected TRPs in the proximity of a UE and received by that UE when the UE is scheduled for data transmission, the methods and devices according to the above aspects of the embodiments facilitate simultaneous transmissions to more than one UEs from selected TRPs in the proximity of the UEs within the same combined cell, which in turn allows for an increased system capacity of the combined cell.

Moreover, as a periodic pilot signal for channel estimation is transmitted with relatively low power from the same TRP prior to the scheduled data transmission, accurate channel estimation even prior to the scheduled data transmission can be achieved at the expense of relatively low power consumption, which in turn allows for accurate scheduling and link adaptation.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF THE PREFERRED EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
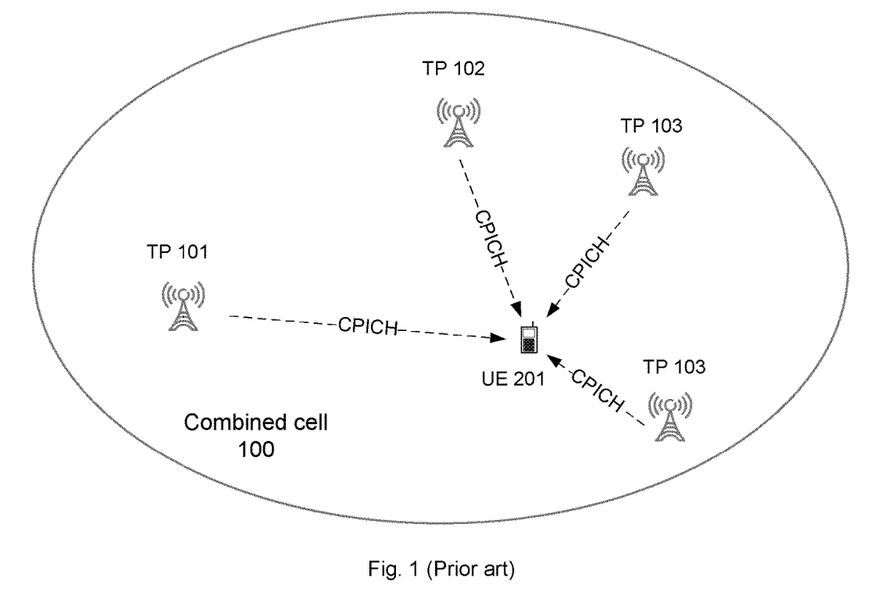
FIG. 1 is a diagram schematically illustrating a pilot transmission scheme according to the prior art.

FIG. 1 schematically illustrates a pilot transmission scheme according to the prior art. As illustrated in FIG. 1, four TRPs 101-104 are distributed in a combined cell 100. Although a UE 201 is geographically closest to the TRP 104, all TRPs 101-104 transmit the same Common Pilot Channel (CPICH) to the UE 201. In this case, the UE 201 cannot estimate the single channel from the TRP 104 to itself, and thus cannot perform data reception via this channel.

Figure 2:
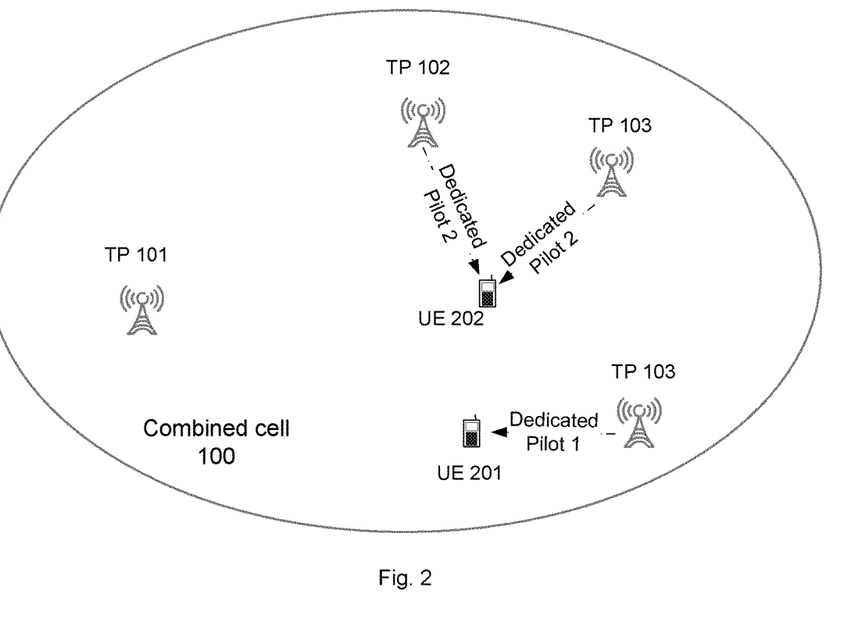
FIG. 2 is a diagram schematically illustrating a pilot transmission scheme according to the present disclosure.

For comparison, FIG. 2 schematically illustrates a pilot transmission scheme according to the present disclosure. Note that CPICH is still transmitted from all TRPs within the combined-cell 100, although it is not expressly shown for the sake of simplicity. As illustrated in FIG. 2, dedicated pilots are newly introduced in the combined cell 100. In contrast with CPICH transmitted from all TRPs within the combined cell, a dedicated pilot is transmitted from one or more selected TRPs in the proximity of the UE. As exemplified in FIG. 2, a dedicated pilot 1 is transmitted from TRP 104 to UE 201, and the same dedicated pilot 2 is transmitted from TRPs 102 and 103 to UE 202. In this case, based on the received dedicated pilot 1, the UE 201 can estimate the single channel from the TRP 104 to itself, so that the UE 201 can perform data transmission and reception with only one TRP (TRP 104, in this example) in its proximity within the combined cell 100. Likewise, based on the received dedicated pilot 2, the UE 202 can estimate the channels from the TRPs 102 and 103 to itself, so that the UE 202 can perform data transmission and reception with more than one TRP (TRPs 102 and 103, in this example) in its proximity within the combined cell 100. That is, a spatial reuse scheme (i.e., simultaneous transmissions to more than one UEs from selected TRPs in the proximity of the UEs) can be implemented for the UE 201 and the UE 202 within the combined cell 100, and a SFN or a (distributed) MIMO transmission scheme (i.e., transmission from more than one selected TRPs to a UE) can be implemented for the UE 202 within the combined cell 100.

Remarkably, the SFN scheme facilitated by the dedicated pilot is superior to the conventional SFN scheme facilitated by the CPICH in that it avoids transmissions from remote TRPs, which make negligible contribution to the useful signal but make considerable contribution to the interference.

As known to those skilled in the art, the expression "a TRP is in the proximity of a UE" means that the distance from the TRP to the UE is lower than a certain length. Therefore, a straightforward manner for determining whether a TRP is in the proximity of a UE is to acquire the position of the UE (for example, by requesting the UE's Global Positioning System (GPS) position from the UE), calculate the distance between the TRP and the UE based on the known position of the TRP and the acquired position of the UE, and compare the calculated distance with a prescribed length.

To determine their proximity to a UE for TRPs within a combined cell in the above manner, the same length or different lengths may be prescribed for the TRPs. In the former case, to ensure that at least one TRP may be selected to serve the UE, the length may be prescribed as the maximum of service area radii of all TRPs in the combined cell. In the latter case, various lengths may be prescribed by the network operator for different TRPs.

As an alternative to the straightforward manner described above, instantaneous or time-average strengths of uplink control signals received at the TRPs from the UE may be employed to determine which TRP(s) within the combined cell is (are) in the proximity of the UE. Specifically, in the beginning, the TRP receiving one of the uplink control signals with the highest signal strength is determined as the optimal TRP, which is of course considered to be in the proximity of the UE. Then, it is determined whether any other TRP receives a uplink control signal with a signal strength not lower than the highest signal strength by a threshold (which is typically between 3-5 dB in logarithmic scale). If so, the TRP is able to provide the UE with a significantly improved link quality when operating in combination with the optimal TRP, and therefore may also be determined to be in the proximity of the UE. Otherwise, only the optimal TRP is determined to be in the proximity of the UE.

The dedicated pilot can be configured to the UE and exclusively used by the UE, once the UE enters the combined cell. This implies that the dedicated pilot is UE specific and will not change when the UE moves between TRPs within the combined cell.

Alternatively or additionally, the dedicated pilot can be configured to the UE by determining which UE group the UE belongs to and allocating a dedicated pilot shared by UEs in the UE group to the UE. In this regard, the dedicated pilot is group specific. To be specific, if a UE transfers from group A to group B, it cannot use the dedicated pilot specific to group A anymore; instead, the dedicated pilot specific to group B shall be used.

By way of example, a UE may be determined as belonging to a SFN group or a non-SFN group, according to whether the UE applies the SFN transmission scheme or not applies the SFN transmission scheme.

It should be understood by those skilled in the art that various other criteria could be applied to group UEs, without departing from claimed subject matter.

For example, UEs may be grouped according to one or more of their capability, speed or the like, in addition to or instead of whether the SFN transmission scheme is applied. Specifically, in addition to or instead of whether it applies the SFN transmission scheme or not, a UE may be grouped according to whether or not it is MIMO-capable and/or which speed range its moving speed falls into.

In this manner, UEs using the same transmission scheme and/or having the same capability and/or similar moving speeds may be grouped together.

Likewise, the dedicated pilot can be configured to the UE by determining which area the UE is located in and allocating a dedicated pilot shared by UEs located in that area to the UE. In this regard, the dedicated pilot is area specific. To be specific, if a UE moves from area A to area B, it cannot use the dedicated pilot specific to area A anymore; instead, the dedicated pilot specific to area B shall be used.

By way of example and not limitation, an area may be covered by one TRP within a combined-cell or geographically adjacent TRPs within a combined-cell, and a UE may be determined as located in that area if it is served by any of the TRPs covering the area. The area may vary in shape and/or in size, according to which TRP(s) covers it.

It is also possible to determine which area a UE is located in according to which area the geographical position of the UE falls into. The geographical position of the UE may be acquired by requesting the GPS position from the UE directly or by measuring the strength of the uplink control signal from the UE and estimating the UE's position based on the measured signal strength indirectly.

As those skilled in the art would appreciate, the area where a UE is located may also be considered as a factor for grouping UEs. By way of example, UEs located in the same area and using the same transmission scheme and/or having the same capability and/or similar moving speeds may be grouped together.

Simply for the purpose of facilitating the spatial reuse and SFN transmission schemes, introducing a dedicated pilot for demodulation whilst using the existing CPICH for scheduling and link adaptation might be adequate. However, in this manner, there will be a mismatch between the actual channel on which data transmission occurs and the estimated channel on which scheduling and link adaptation is based. This mismatch in turn may adversely degrade the achievable data transmission rate.

Transmitting the pilot for demodulation when the UE is not scheduled for data transmission and performing scheduling and link adaptation based on the pilot may eliminate the mismatch, but will adversely increase power consumption and interference.

In the following, methods and devices are proposed for achieving accurate channel estimation even prior to the scheduled data transmission at the expense of relatively low power consumption.

Figure 3:
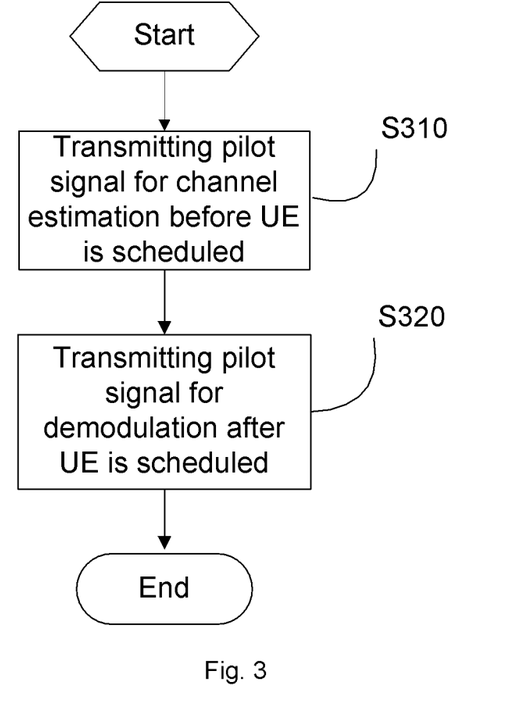
FIG. 3 is a flowchart schematically illustrating a pilot signal transmission method according to an embodiment of the present disclosure.

FIG. 3 is a flowchart schematically illustrating a pilot signal transmission method according to an embodiment of the present disclosure. As illustrated, after a start of the proposed method, a periodic pilot signal for channel estimation is transmitted from at least one TRP in the proximity of a UE when the UE is not scheduled for data transmission (S310). Then, a pilot signal for demodulation from the same TRP is transmitted when the UE is scheduled for data transmission (S320). As compared with the pilot signal for demodulation, the periodic pilot signal for channel estimation is transmitted with lower power. After step S320, the proposed method ends.

Figure 5:
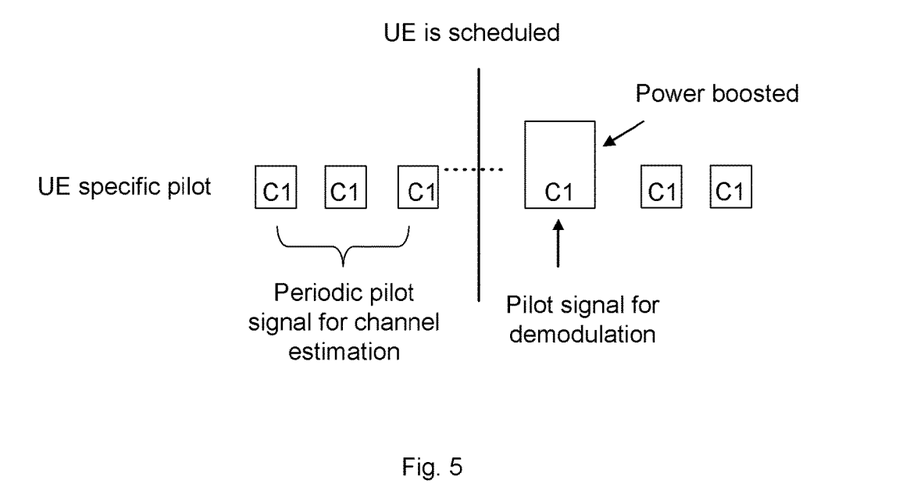
FIG. 5 is a diagram schematically illustrating a periodic pilot signal for channel estimation and a pilot signal for demodulation that are exclusively used by one UE.

For the UE-specific dedicated pilot scheme described above, the periodic pilot signal for channel estimation and the pilot signal for demodulation can be transmitted in a Time Division Multiplexing (TDM) manner and by using the same channelization code, as shown in FIG. 5.

Figure 6:
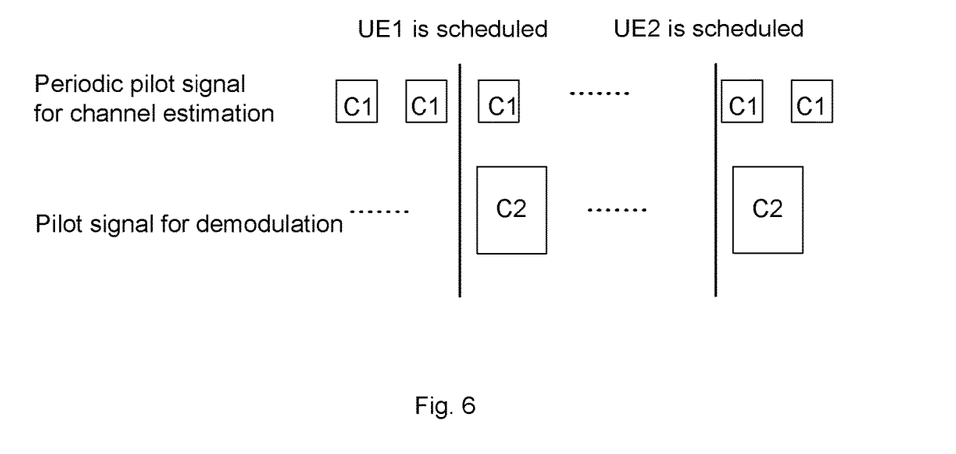
FIG. 6 is a diagram schematically illustrating a periodic pilot signal for channel estimation and a pilot signal for demodulation that are shared by more than one UEs.

For the group/area dedicated pilot scheme described above, the periodic pilot signal for channel estimation and the pilot signal for demodulation should be distinguished by different channelization codes, as shown in FIG. 6.

In this case, UEs in the same group/area use the periodical pilot signal for channel estimation, when none of them is scheduled. When a UE is scheduled, the pilot signal for demodulation is transmitted with larger power. The scheduled user begins to use this pilot signal (or together with the periodic pilot signal) for demodulation (or together with channel estimation). The other non-scheduled users in the same group/area can use the periodic pilot signal for channel estimation. As such, every UE in the same group/area can perform accurate channel estimation even prior to being scheduled for data transmission at the expense of relatively low power consumption.

Figure 4:
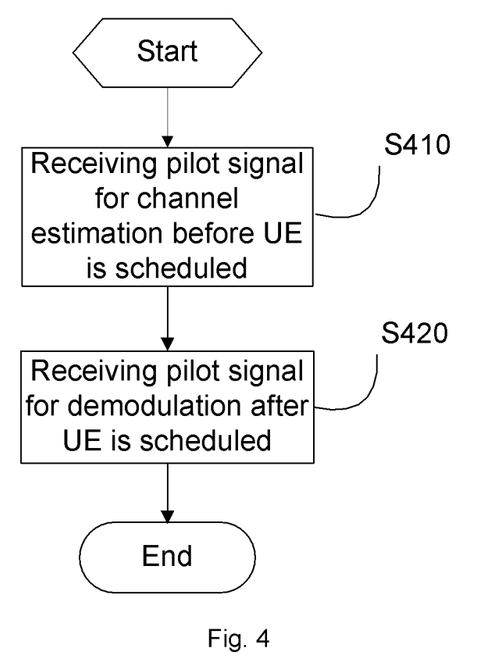
FIG. 4 is a flowchart schematically illustrating a pilot signal reception method according to an embodiment of the present disclosure.

FIG. 4 schematically illustrates a pilot signal reception method according to the present disclosure. This method corresponds to the above-described pilot signal transmission method and is implemented at a UE. As illustrated, after a start of the proposed method, a periodic pilot signal for channel estimation is received by the UE from at least one TRP in the proximity of a UE when the UE is not scheduled for data transmission (S410). Then, a pilot signal for demodulation is received from the same TRP when the UE is scheduled for data transmission (S420). The transmission power of the periodic pilot signal for channel estimation is lower than that of the pilot signal for demodulation. After step S420, the proposed method ends.

In the following, the functional module architectures of a TRP 700 and a UE 800 according to the present disclosure will be given with reference to FIGS. 7 and 8, respectively.

Figure 7:
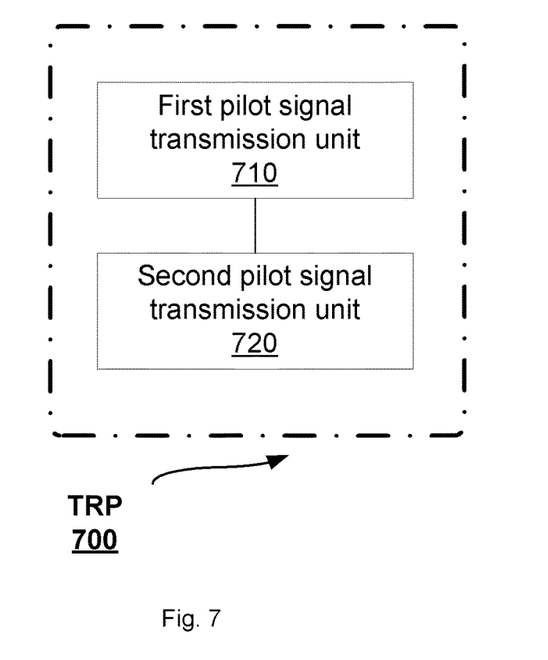
FIG. 7 is a block diagram schematically illustrating an example of a structure of a TRP according to the present disclosure.

As shown in FIG. 7, the TRP 700 comprises a first pilot signal transmission unit 710 and a second pilot signal transmission unit 720. The first pilot signal transmission unit 710 is configured to transmit a periodic pilot signal for channel estimation from at least one TRP in the proximity of a UE, when the UE is not scheduled for data transmission.

The second pilot signal transmission unit 720 is configured to transmit a pilot signal for demodulation from the same TRP, when the UE is scheduled for data transmission. The transmission power of the periodic pilot signal for channel estimation is lower than that of the pilot signal for demodulation.

As those skilled in the art will appreciate, the first pilot signal transmission unit 710 and the second pilot signal transmission unit 720 may be implemented separately as suitable dedicated circuits. Nevertheless, the above-described units can also be implemented using any number of dedicated circuits through functional combination or separation. In some embodiments, the above-described units may be even combined in a single application specific integrated circuit (ASIC).

As an alternative software-based implementation, there may be provided a TRP comprising a memory and a processor (including but not limited to a microprocessor, a microcontroller or a Digital Signal Processor (DSP), etc.) The memory stores machine-readable program code executable by the processor to control the TRP to perform the method as described above with reference to FIG. 3. As a non-limiting example, the processor may be operable to perform the functions of the first pilot signal transmission unit 710 and the second pilot signal transmission unit 720 mentioned above.

Figure 8:
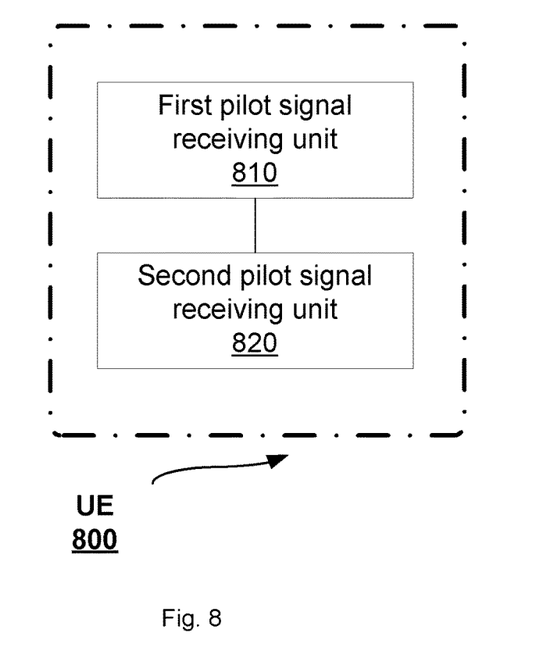
FIG. 8 is a block diagram schematically illustrating an example of a structure of a UE according to the present disclosure.

As shown in FIG. 8, the UE 800 comprises a first pilot signal receiving unit 810 and a second pilot signal receiving unit 820. The first pilot signal receiving unit 810 is configured to receive a periodic pilot signal for channel estimation from at least one TRP in the proximity of a UE, when the UE is not scheduled for data transmission. The second pilot signal receiving unit 820 is configured to receive a pilot signal for demodulation from the same TRP, when the UE is scheduled for data transmission. The transmission power of the periodic pilot signal for channel estimation is lower than that of the pilot signal for demodulation.

Likewise, as those skilled in the art will appreciate, the first pilot signal receiving unit 810 and the second pilot signal receiving unit 820 may be implemented separately as suitable dedicated circuits. Nevertheless, the above-described units can also be implemented using any number of dedicated circuits through functional combination or separation. In some embodiments, the above-described units may be even combined in a single application specific integrated circuit (ASIC).

As an alternative software-based implementation, there may be provided a UE comprising a memory and a processor (including but not limited to a microprocessor, a microcontroller or a Digital Signal Processor (DSP), etc.) The memory stores machine-readable program code executable by the processor to control the UE to perform the method as described above with respect to FIG. 4. As a non-limiting example, the processor may be operable to perform the functions of the first pilot signal receiving unit 810 and the second pilot signal receiving unit 820 mentioned above.

Further, the present disclosure concerns a computer readable medium storing therein a program for a TRP or a UE. The program causes the TRP or the UE to perform the pilot signal transmission method or the pilot signal reception method described above. The computer readable medium may be of any type including but not limited to a hard disk drive, a Compact Disc (CD), a Digital Video Disk (DVD), a digital tape, memory, etc.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

REFERENCE

[1] RP-121436 Study on UMTS Heterogeneous Networks

What is claimed is:

1. A pilot signal transmission method performed by a Transmit-Receive Point (TRP) in a wireless communication system, wherein said TRP is in the proximity of a User Equipment (UE), said method comprising:
   transmitting a periodic pilot signal for channel estimation from the TRP within a combined cell to the UE, when the UE is not scheduled for data transmission; and
   transmitting a pilot signal for demodulation from the same TRP within the combined cell to the UE, when the UE is scheduled for data transmission,
   wherein a transmission power of the periodic pilot signal for channel estimation is lower than that of the pilot signal for demodulation, and
   wherein the pilot signal for demodulation is used along with the periodic pilot signal for channel estimation for performing the process of demodulation and channel estimation simultaneously.

2. The method according to claim 1, wherein
   the periodic pilot signal for channel estimation and the pilot signal for demodulation are transmitted in a Time Division Multiplexing (TDM) manner and by using same channelization code, when the pilot signals are exclusively used by the UE.

3. The method according to claim 1, wherein
   the periodic pilot signal for channel estimation and the pilot signal for demodulation are transmitted by using different channelization codes, when the pilot signals are shared by more than one UEs.

4. The method according to claim 3, wherein
   when a UE is scheduled,
      the pilot signal for demodulation or both the pilot signal for demodulation and the periodic pilot signal for channel estimation are used by the scheduled UE to perform demodulation or both demodulation and channel estimation; and
      the periodic pilot signal for channel estimation is used by other non-scheduled UEs to perform channel estimation.

5. A Transmit-Receive Point (TRP), which is in the proximity of a UE, said TRP comprising one or more processors configured to:
   transmit a periodic pilot signal for channel estimation from the TRP within a combined cell to the UE, when the UE is not scheduled for data transmission; and
   transmit a pilot signal for demodulation from the same TRP within the combined cell to the UE, when the UE is scheduled for data transmission,
   wherein a transmission power of the periodic pilot signal for channel estimation is lower than that of the pilot signal for demodulation, and
   wherein the pilot signal for demodulation is used along with the periodic pilot signal for channel estimation for performing the process of demodulation and channel estimation simultaneously.

6. A pilot signal reception method performed by a User Equipment (UE) in a wireless communication system, comprising:

receiving a periodic pilot signal for channel estimation from at least one Transmit-Receive Point (TRP) in the proximity of a User Equipment (UE) within a combined cell, when the UE is not scheduled for data transmission; and receiving a pilot signal for demodulation from the same TRP within the combined cell, when the UE is scheduled for data transmission, wherein a transmission power of the periodic pilot signal for channel estimation is lower than that of the pilot signal for demodulation, and wherein the pilot signal for demodulation is used along with the periodic pilot signal for channel estimation for performing the process of demodulation and channel estimation simultaneously.

7. The method according to claim 6, wherein
the periodic pilot signal for channel estimation and the pilot signal for demodulation are received in a Time Division Multiplexing (TDM) manner and by using same channelization code, when the pilot signals are exclusively used by the UE.

8. The method according to claim 6, wherein
the periodic pilot signal for channel estimation and the pilot signal for demodulation are received by using different channelization codes, when the pilot signals are shared by more than one UEs.

9. The method according to claim 8, wherein
when a UE is scheduled,
   the scheduled UE performs demodulation or both demodulation and channel estimation, based on the pilot signal for demodulation or both the pilot signal for demodulation and the periodic pilot signal for channel estimation; and
   other non-scheduled UEs perform channel estimation, based on the periodic pilot signal for channel estimation.

10. A User Equipment (UE), comprising one or more processors configured to:

receive a periodic pilot signal for channel estimation from at least one TRP in the proximity of the UE within a combined cell, when the UE is not scheduled for data transmission; and receive a pilot signal for demodulation from the same TRP within the combined cell, when the UE is scheduled for data transmission, wherein a transmission power of the periodic pilot signal for channel estimation is lower than that of the pilot signal for demodulation, and wherein the pilot signal for demodulation is used along with the periodic pilot signal for channel estimation for performing the process of demodulation and channel estimation simultaneously.

11. A Transmit-Receive Point (TRP), comprising:
a memory which has machine-readable program code stored therein; and
a processor which executes the stored program code to control the TRP to perform the method according to claim 1.

12. A User Equipment (UE), comprising:
a memory which has machine-readable program code stored therein; and
a processor which executes the stored program code to control the UE to perform the method according to claim 6.

13. A non-transitory computer readable medium having computer executable instructions stored therein, which when executed by a processor of a Transmit-Receive Point (TRP) causes the processor to perform a method according to claim 1.

14. A non-transitory computer readable medium having computer executable instructions stored therein, which when executed by a processor of a User Equipment (UE) causes the processor to perform a method according to claim 6.

* * * * *